(12) United States Patent
Stultz et al.

(10) Patent No.: US 7,707,315 B2
(45) Date of Patent: Apr. 27, 2010

(54) SYSTEM AND METHOD FOR PROPAGATING DATA

(75) Inventors: Robert D. Stultz, Melbourne, FL (US); John A. Hamilton, Mims, FL (US); John D. Overturf, West Melbourne, FL (US); Kenneth C. Whedbee, Jr., Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 1604 days.

(21) Appl. No.: 10/445,540

(22) Filed: May 27, 2003

(65) Prior Publication Data

US 2004/0243721 A1   Dec. 2, 2004

(51) Int. Cl.
*G06F 15/16* (2006.01)

(52) U.S. Cl. ...................................................... 709/246
(58) Field of Classification Search ................. 709/246; 703/8
See application file for complete search history.

(56) References Cited

U.S. PATENT DOCUMENTS

| | | | |
|---|---|---|---|
| 3,700,820 A * | 10/1972 | Blasbalg et al. ............. | 370/468 |
| 5,541,919 A * | 7/1996 | Yong et al. ................... | 370/416 |
| 5,729,544 A * | 3/1998 | Lev et al. ..................... | 370/352 |
| 6,014,628 A | 1/2000 | Kovarik, Jr. .................... | 705/1 |
| 6,048,366 A * | 4/2000 | Ellis et al. ....................... | 703/8 |
| 6,108,626 A | 8/2000 | Cellario et al. .............. | 704/230 |
| 6,256,602 B1 | 7/2001 | Ellis et al. ....................... | 703/8 |
| 6,349,340 B1 | 2/2002 | Dyer et al. ................... | 709/231 |
| 6,442,596 B1 | 8/2002 | Dyer et al. ................... | 709/207 |
| 6,522,654 B1 | 2/2003 | Small .......................... | 370/400 |
| 6,523,066 B1 | 2/2003 | Montroy et al. ............. | 709/229 |
| 2002/0085531 A1 | 7/2002 | Herrmann et al. ........... | 370/338 |

FOREIGN PATENT DOCUMENTS

WO    01/55874    8/2001

* cited by examiner

*Primary Examiner*—Benjamin R Bruckart
*Assistant Examiner*—Farhad Ali
(74) *Attorney, Agent, or Firm*—Allen, Dyer, Doppelt, Milbrath & Gilchrist, P.A.

(57) ABSTRACT

A system and method for propagating data commutates data from different data sources into a data stream based on a commutation format. The data is received and decommutated to replicate the data. The commutation format can be changed for prioritizing different data from the data sources.

31 Claims, 4 Drawing Sheets

SYSTEM AND METHOD FOR PROPAGATING DATA

FIELD OF THE INVENTION

The present invention relates to the field of data propagation, and more particularly, the present invention relates to a data propagation system and method for replicating a changing data set.

BACKGROUND OF THE INVENTION

Many communication systems are packet based, and in some areas such as battlefield management of personnel, tanks, or other items, the packets are difficult to implement. For example, it could be difficult to determine what data is transmitted first. There also are limited bandwidth considerations and it is difficult to determine which packets to drop and which to send. This could be critical in any battlefield management situation if one battle group begins moving and its data becomes more important (or has higher priority) to any command unit that receives and processes that data. Naturally, any high priority data should not be dropped and must be propagated in some fashion to the command.

Some database solutions have been proposed. In one proposed solution, updates are transaction based and each transaction contains additional information required to route and process the data. Any replication of a data set and its update frequency would require significant software development. Also, congestion control and prioritization are difficult to implement and modify. As data changes in priority and/or becomes more dynamic, a solution for optimizing how it is propagated becomes difficult to resolve.

SUMMARY OF THE INVENTION

In view of the foregoing background, it is therefore an object of the present invention to provide a system for propagating data that overcomes the disadvantages of the prior art.

It is another object of the present invention to provide a database driven commutation/decommutation system and method for overcoming the disadvantages of the prior art described above.

The present invention uses a database driven commutation/decommutation system, preferably based on the OS/Comet® product suite as a COTS product, used for satellite command and control and integration and testing, manufactured and sold by Harris Corporation of Melbourne, Fla.

The present invention requires little software development. It is easy to modify and is database driven. The invention uses a dynamic commutation format and switches the format to reprioritize data. The new commutation format dynamically changes the data set and update frequency. A new commutation format can be initiated from a sender (transmitter) or receiver. Any congestion control along a communications channel, for example, a serial communications channel, can be controlled through the commutation format definition.

The present invention is advantageous over other database transaction processing (DTP) and allows the commutation/decommutation process to replicate data used in non-telemetry type systems, for example, battlefield management systems. Based on an available data set, the system can visually define the data samples, its update frequency, and its priority for any transmitted data. New commutation formats can be created and modified dynamically and initiated based on any needs perceived by the sender or receiver. New commutation formats can be based on changing data needs, required update frequency, and any bandwidth limitations. Congestion and prioritization can be controlled by the commutation format definition. A sender can provide multiple commutation formats to one or many receivers.

In one aspect of the present invention, the system propagates data and includes a commutation engine for commutating data from different data sources into a data stream based on a commutation format. A decommutation engine receives the data stream and replicates the data. A commutation database has commutation format definitions that are operative with the commutation and decommutation engines and drives the commutation and decommutation based on the commutation format. The database can include appropriate commutation and decommutation tables. The system and method of the present invention changes the commutation format for prioritizing different data to be commutated and replicated.

In yet another aspect of the present invention, a database stores sampled data from different data sources from which data is commutated. A commutation format generator is operative with the commutation database and updates the commutation database with the new commutation format. The commutation database stores multiple commutation format definitions to be used with multiple receivers. The commutation format can be changed based on a change in environment effecting the data stream, on a change in priority of data, or on changing data requirements at a receiver. A change in the commutation format definition can be initiated by a receiver or a transmitter.

In yet another aspect of the present invention, the system includes a distributed messaging system operative with the commutation engine and providing communications among various modules that generate the format data into a data stream based on the commutation format. In one aspect of the present invention, the modules could include a data stream generator module, a data stream commutation format module, and a data output module that could be application specific for a receiver of the data. The distributed messaging system could be an OS/Comet® software bus. Other distributed messaging systems could be CORBA or DECOM.

The system includes a decommutation engine that decommutates the data stream received from the communications channel and replicates the data in the database using the commutation format definition stored in the commutation database. The decommutation engine would typically draw upon a decommutation table and decommutation format definitions. The decommutation engine can include an input module and decommutation module as part of the decommutation engine. It can be operative with a distributed messaging system.

A method aspect of the present invention is also disclosed and propagates data for commutating data from different data sources into a data stream based on a commutation format. Based on the commutation format, the data is decommutated to replicate the data. The method of the present invention advantageously changes the commutation format for prioritizing different data from the data sources.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention allows dynamic determination of data selection and its update frequency for data propagation. It allows replication of a changing data set over a limited bandwidth used for propagating data. It also permits selection of any frequency of data updates and permits congestion and prioritization control. It is a database driven solution that is advantageous over prior art database transaction processing (DTP), in which database updates were typically transaction based and each transaction contained additional information required to route and process the data. The replication set and update frequency would require significant software development and congestion control and prioritization in the prior art techniques are difficult to implement and modify. As data changes in priority and/or becomes more dynamic, it is difficult to resolve how it is optimally propagated.

In a battlefield management system, many different types of data must be propagated throughout the entire arena. Data that is changing and sampled can be readily and efficiently shipped from sender to one or many receivers using the commutation/decommutation formatting of the present invention. As the battlefield scenario unfolds, different data types will become more critical, but the bandwidth provided for propagation may not be sufficient. In accordance with the present invention, by changing the commutation format, a new or modified data set and data update frequency scheme can be easily implemented to fit within the allotted bandwidth with deterministic results. As part of the commutation/decommutation system, the new commutation formats can be passed from the sender to receiver(s) prior to the switch, therefore allowing fully dynamic determination of what data is selected for propagation and at what update frequency.

This invention is different from past practice in the dynamic creation and modification of commutation formats in response to changing requirements in the data set being replicated point-to-point or point-to-multipoint. The dynamic commutation format updates address changes in data selection criteria and data item update frequency to account for reprioritization and congestion control in a database driven commutation/decommutation data propagation system.

This invention could be used for many types of data including GPS position information for individuals or for equipment, biographical data for infantry, including heart rate and cardiovascular data, ammunition status, equipment state of health information, including oil pressure, fuel level and component wear, environmental data, including temperature, humidity and chemical or hazardous gas sensors.

The dynamic changes could be the result of changing requirements on behalf of either the sender or receiver. They could be driven by quality of service requirements and the dynamically changing battlefield arena.

The present invention is a database driven and commutation/decommutation based. It can use the OS/Comet® TT&C commercial COTS product as distributed by Harris Corporation and modified for use in the present invention. All tools of the OS/Comet® product suite can be applicable for the present invention.

The present invention can be implemented with little software development and can be modified and database driven. It allows dynamic commutation format generation and switching to handle prioritization. The commutation format can dynamically change a data set and its update frequency. The new commutation format can be initiated by the transmitter (sender) or receiver. Congestion control through the data path can occur through a commutation format definition.

The present invention is advantageously used in battlefield management systems that use sampled and changing data, which must be distributed to one or multiple users over a typical serial connection having a limited bandwidth.

Figure 1:
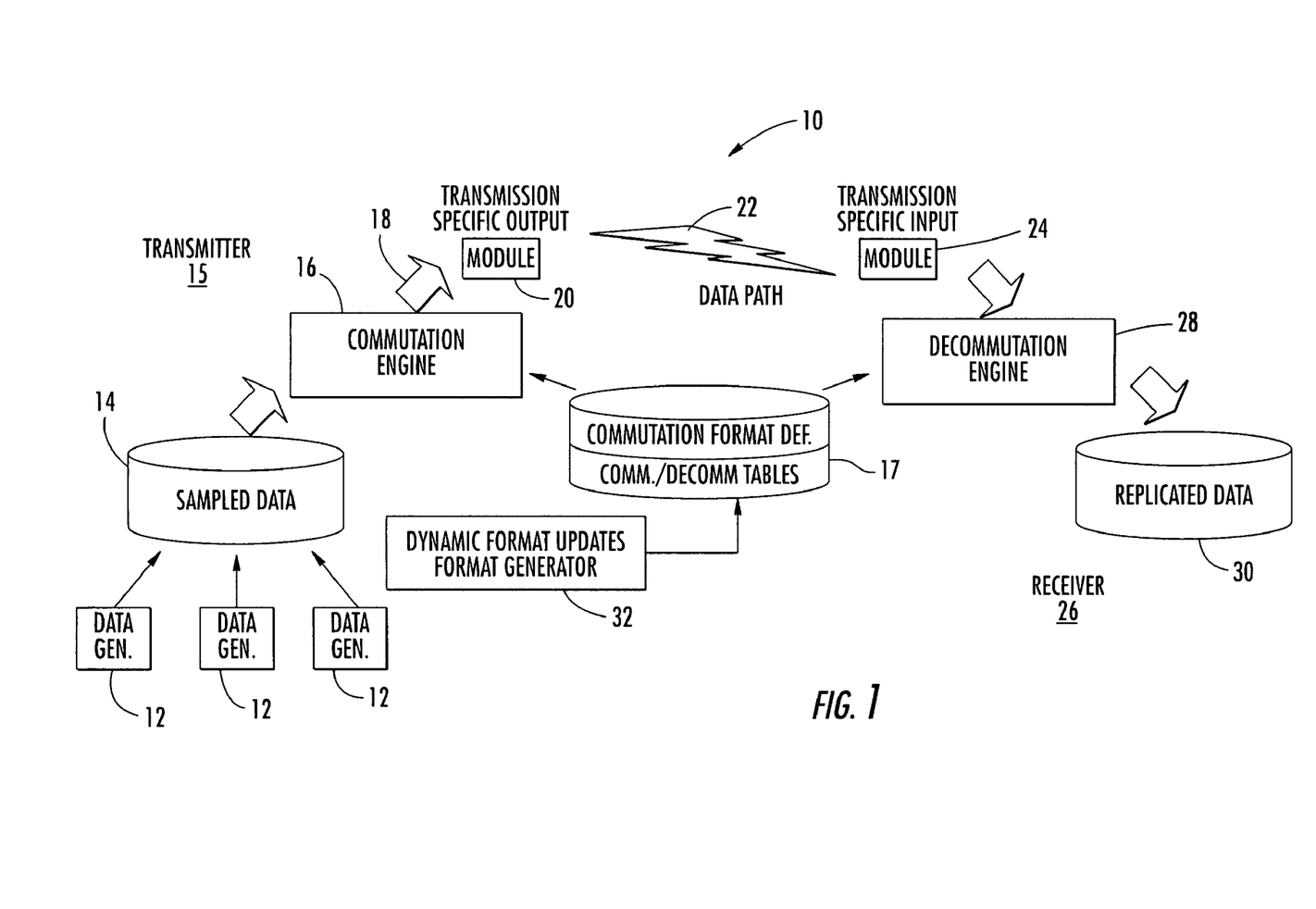
FIG. 1 is a high level block diagram of the system and method of the present invention and showing the commutation and decommutation engines, sampled data from data generators, replicated data, and a commutation format database with commutation and decommutation tables.

FIG. 1 is a fragmentary, high level block diagram of basic components used in the data propagation system 10 of the present invention and showing different data sources 12, for example, individual tanks or infrantrymen, which supply data as sampled data into a database 14. A transmitter 15 includes a commutation engine 16 operable with the commutation database 17 having commutation format definitions, including commutation and decommutation tables for commutation and decommutation. The term commutation format generally can refer to the definitions used for commutation and decommutation.

The commutation engine 16 commutates data from the different data sources 12 into a data stream 18 based on the commutation format and outputs commutated data as a preferred serial data stream through an output module 20 and into a serial communications channel 32 to an input module 24 of a receiver 26. A decommutation engine 28 receives the data stream from the input module, decommutates the data to replicate the data in a replicated database 30, as illustrated. The commutation database 17 stores commutation format definitions that are operative with the commutation and decommutation engines 16,28 for driving the commutation and decommutation based on the commutation format and changing the commutation format and prioritizing different data to be commutated and replicated. The database 14 stores sampled data from the different data sources 12 and the sampled data is commutated.

In the present invention, a commutation format generator 32 could be a processor or other logical circuit and is operative with the commutation database 17 for updating the commutation database with any new commutation format definitions. This allows the system to change the commutation format and prioritize different data to be commutated and replicated. The commutation database can store multiple commutation format definitions to be used with multiple receivers that require different data or prioritize data differently.

The commutation format could be changed based on a change in priority of data, any changed data requirements at a receiver, or a change in environment effecting the data stream, such as changing bandwidth caused by environmental conditions, e.g., a sand storm.

Figure 2:
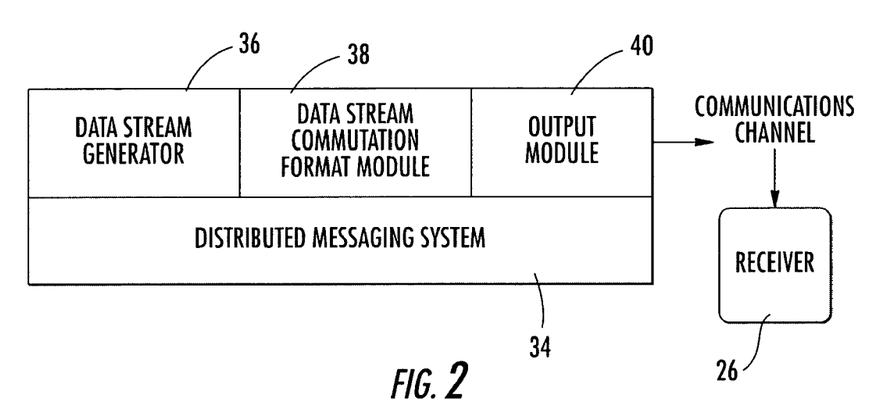
FIG. 2 is a block diagram of a commutation engine of the present invention and having different software modules operative with a distributed messaging system.

As shown in FIG. 2, the transmitter 15 and commutation engine 16 include a distributed messaging system 34 that provides communications among modules that generate and format data into a data stream based on a commutation format. The various modules can include a data stream generator module 36, data stream commutation format module 38 and data stream output module 40, which can be application specific for a receiver. For example, data stream output module 40 can apply appropriate messaging protocols for communicating with a receiver. It can obtain data from a database as necessary. An interface could be the OS/Comet® software bus. It could also include system V sockets, RS-232 or RS-422 serial data link. Appropriate sequencing, error detection and error correction mechanisms can be used.

Figure 3:
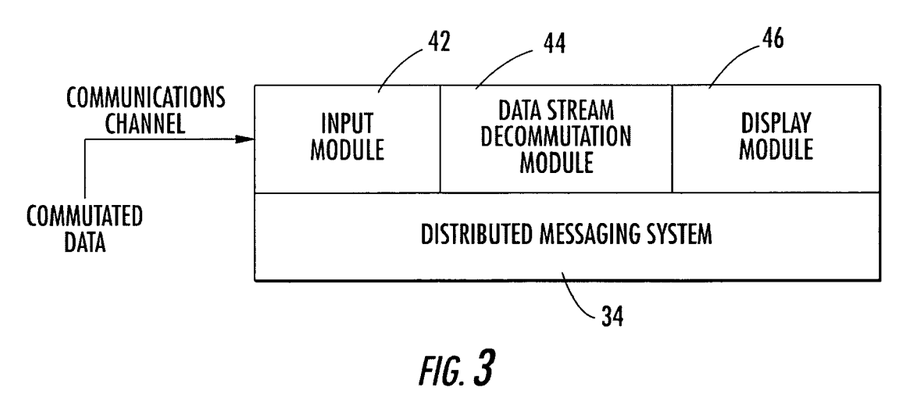
FIG. 3 is a block diagram of a decommutation engine of the present invention and having different software modules operative with a distributed messaging system.

As shown in FIG. 3, the decommutation engine 28 could also include a distributed messaging system 34 and different modules, including an input module 42 and data stream decommutation module 44 that decommutates data based on the commutation format (decommutation table). Depending on the type of data, a graphical user interface can be driven by a display module 46 for displaying data that has been prioritized. The input module 42 can be application specific.

The commutation and decommutation engines 16,28 are operable with the commutation database 17, which includes appropriate commutation and decommutation tables that can be updated by the format generator 32. Other details of the decommutation and commutation engines and associated modules and functions, including operation of OS/Comet® and can be modified for use with the present invention, are disclosed in commonly assigned U.S. Pat. Nos. 6,048,366 and 6,256,602 to Ellis et al. and commonly assigned WO 01/55874, the disclosures which are hereby incorporated by reference in their entirety.

Figure 4:
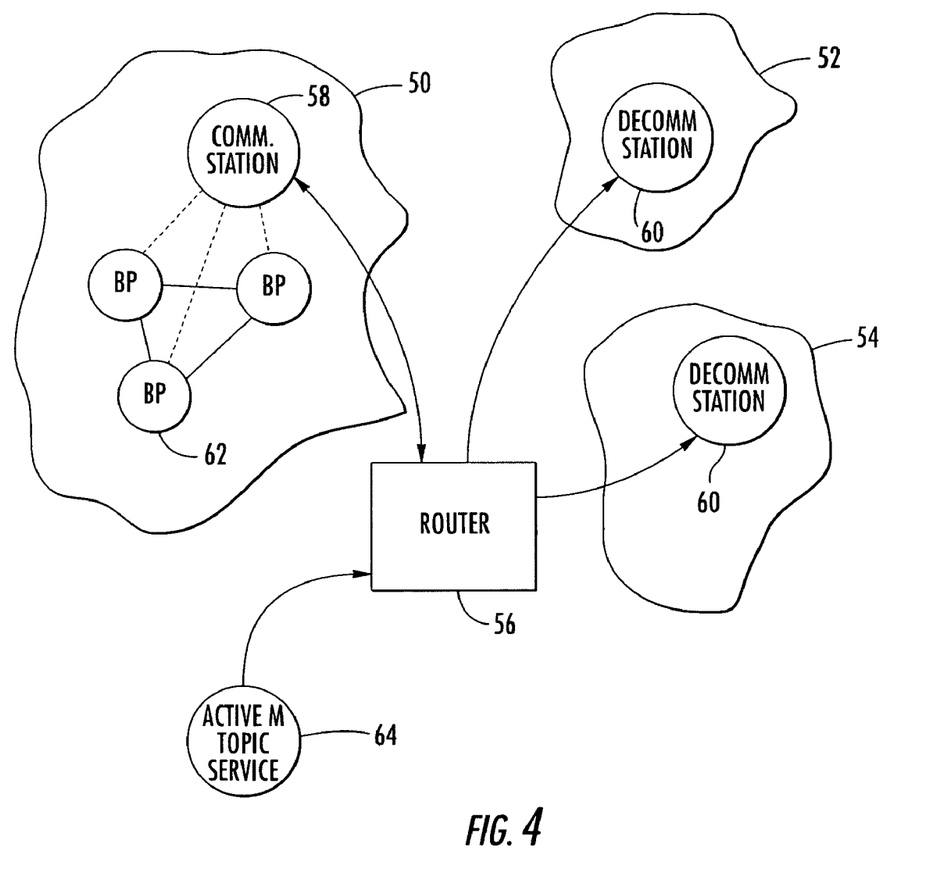
FIG. 4 is a high level block diagram of a battlefield management system and showing basic commutation and decommutation stations operative with routers and an ActiveM TOPIC Service.

FIG. 4 is a high level depiction of several communication networks 50,52,54 interconnected by routers 56. One network 50 includes a commutation station 58 and the other two networks 52,54 each include a decommutation station 60. The overall system 62 can be used as a battlefield management system, for example. The commutation station 58 could be a moving vehicle in communication with various soldiers having backpacks 62, as an example, communicating by wireless signal with the commutation station 58. Each backpack 62 could include a transceiver or other system such as a Compact iPAQ computer using Linux and simulated by a Perform file. The commutation station could be a Sun Workstation, for example, using OS/Comet® software for commutation and operable as an ActiveM router. Any decommutation station could be a similar platform and operable as a router. The commutation and decommutation stations could be operable with DCOM databases holding data from different data sources. The router 56 could be operable with an ActiveM Topic Service 64.

ActiveM software, as developed by Harris Corporation of Melbourne, Fla., is used with Windows and is message-oriented middleware (MOM) that uses distributed applications. ActiveM uses a register (produce) and subscribe (consume) system for message data transfer with intelligent data routing. ActiveM-aware applications can connect to an ActiveM router running on a network node to send and receive data. An ActiveM server running on a single network node can handle topics, subscriptions and registrations and multiple ActiveM subnets can run concurrently on one network. It is possible to communicate between many machines and processors and/or be connected to the internet.

Figure 5:
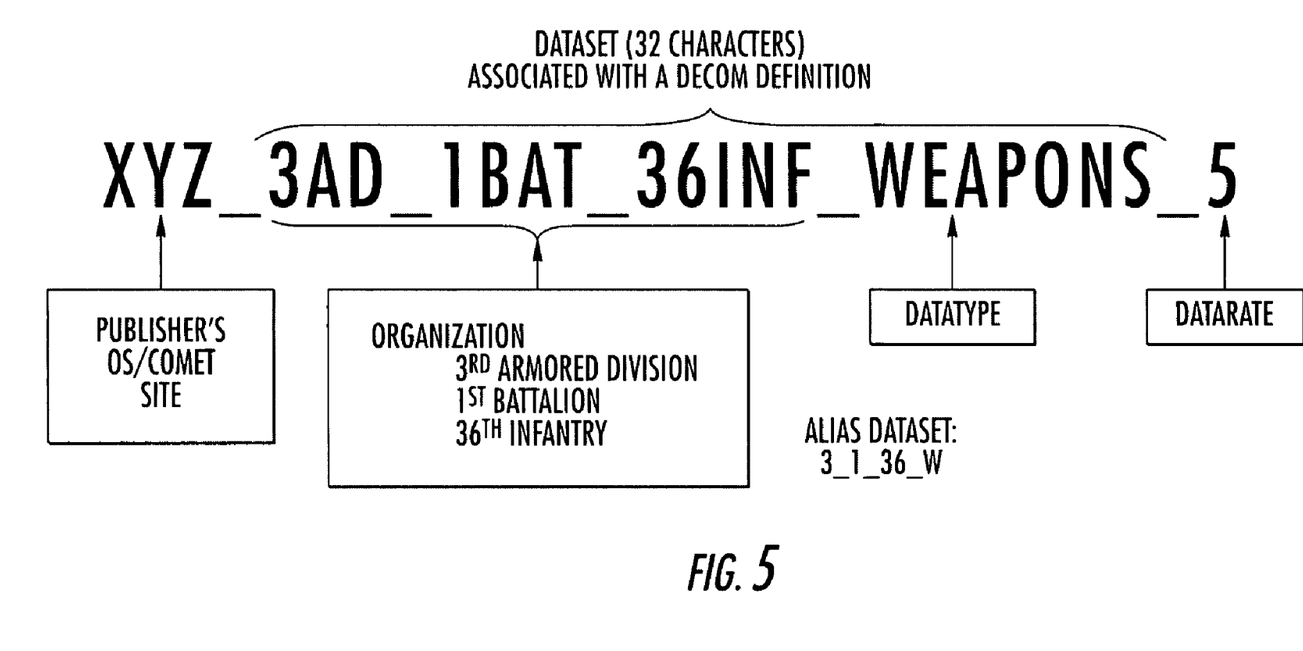
FIG. 5 is a data set of 32 characters that is associated with a decommutation definition as a non-limiting example.

ActiveM allows applications to send data transparently between different processes. ActiveM uses the "published and subscribe concept" where data is made available to other applications by an application that registers a Topic with a server. A subscriber "subscribes to a TOPIC with an ActiveM server before it receives messages of the type specified by the TOPIC. A publisher "registers" a TOPIC with an ActiveM server before it sends messages of the type specified by the TOPIC. When a publisher sends a message, all subscribers of that TOPIC will receive a copy of the message. For example, a data set could be 32 characters and associated with a DECOM definition, such as illustrated in FIG. 5.

When a subscriber and publisher are active, a server informs a router that it is requesting information and establishes a link with the router that is servicing the publishing application. When the connection is made, the application providing the data publishes a message, and it is sent via the routers to the application requesting data. There can be any number of subscribers to a topic. Back-up processes can be used.

The present invention also uses the OS/Comet® software product suite, such as modified for the present invention. This software is a COTS product for satellite command and control, and integration and testing. A different set of COTS tools can be incorporated, including the OA/tool, GC/tool, FA/tool, AR/tool, and SIM/tool. The OS/Comet® software facilitates a specific task related to satellite control and can be modified for use in the present invention, including battlefield management with commutation format definition updates.

The OS/Comet® software bus allows system administration and communication services and is operative for data distribution, language processing as processed CCL, recording and logging. Data distribution is operable with symbol processing and data processing. Language processing circuits can be used for command processing. Different OS/Comet® facilities that can be used in the present invention include a system administration facility that maintains knowledge of OS/Comet® processes and resources. It provides a distributed process naming service with query capability and notification. This facility also manages distribution of system locks and maintains distributed knowledge of OS/Comet® processes and resources.

The communication services facility of OS/Comet® can implement process-to-process message capability and manage communication between OS/Comet® processes as a system and any user-developed systems on a node and between nodes. The symbol processing facility is a specific item of data with associated attributes and can be used for the receipt of data or the specification of command parameters. The symbol attributes can include a name, a conversion function used to convert raw data into engineering units, alarm limit set points, and other conversion functions, for example, for battlefield management. The data can be represented as symbols and can include command parameter data and process status information.

An Mfile is a collection of symbols defined by a symbol definition file and generates run-time optimized symbol tables. A data distribution facility maintains knowledge of each Mfile, including server and clients, and distributes symbol value updates written to an Mfile by a server to open clients of an Mfile. The processing facility with this application software decommutates data into individual symbols.

Any decommutation format as part of the overall commutation format definitions stored in the commutation database defines the packets that may be received for a specific recording format. Decommutation formats can defined off-line using a decommutation definition file, which generates the run-time and optimizes the decommutation database. Of course, the decommutation table is operative as part of the overall format definition.

It is evident that the present invention advantageously allows dynamic determination of data selection and update frequency for data propagation. It uses a database driven communication/decommutation solution and is easy to implement with little software development. It is easy to modify and is database driven. It allows dynamic commutation format generation and allows switching to handle prioritization. The commutation format can dynamically change the data set and its update frequency. A new commutation format can be initiated from the sender or receiver. Congestion control can be through the commutation format definition.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for propagating data among different communications networks comprising:

a first communications network having an output module and a commutation engine and a plurality of communications transceivers that communicate with each other and communicate through the commutation engine and output module to other communications networks, wherein said commutation engine is operable for receiving data as different data types from said plurality of communications transceivers within said first communications network and sampling the data and commutating the data into a serial data stream based on a first commutation format and in priority based on different message types as registered by each communications transceiver;

a router that receives the data stream from the output module in the first communications network and routes the data to other communications networks using the first commutation format and prioritized based on the message types;

at least a second communications network having an input module for receiving the serial data stream and a decommutation engine for receiving the data stream generated at the commutation engine of the first communications network from the router and decommutating the data and a database at the second communications network in which received data after decommutation is replicated based on the first commutation format and including a plurality of receivers with individual ones of said receivers subscribing to a selected message type; and a commutation database associated with the commutation and decommutation engine of the first and second communications networks and having commutation format definitions and commutation and decommutation tables operative with the commutation and decommutation engines for changing the commutation format to a second commutation format that prioritizes different data based on message types to be later commutated and replicated, wherein said commutation engine in said first communications network is operative for changing the commutation format and modifying and prioritizing a data set and data update frequency scheme based on message types as registered by each communications transceiver to fit within an allotted bandwidth through the router to the at least second communications network and transmitted to a selected receiver based on which message type a receiver has subscribed and the decommutation engine at the second communications network decommutates the data and stores the new data with prioritized different data in the database at the second communications network based on the second commutations format.

2. A system according to claim 1, and further comprising a commutation format generator operative with the commutation database for updating the commutation database with a new commutation format.

3. A system according to claim 1, wherein the commutation format is changed based on a change in environment effecting the data stream.

4. A system according to claim 1, wherein the commutation format is changed based on changing data requirements at a receiver at the second communications network.

5. A system according to claim 1, wherein a change in commutation format is initiated by a receiver at the second communications network.

6. A system according to claim 1, wherein a change in commutation format is initiated by a transceiver at the first communications network.

7. A system according to claim 1, and further comprising a distributed messaging system operative with the commutation engine and providing communications among modules that generate and format data into a serial data stream based on the commutation format.

8. A system for propagating data among different communications networks comprising:

a first communications network having a plurality of communications transceivers and an output module as a data transmitter and a commutation engine for receiving data as different data types and sampling the data as received from said communications transceivers and commutating the sampled data received from the communications transceivers within the first communications network into a serial data stream based on a first commutation format and in priority based on different message types as registered by communications transceivers and propagating the data stream into a serial communications channel through the output module;

a router that receives the data stream from the output module in the first communications network and routes the data to other communications networks using the first commutation format and prioritized based on the different message types;

a second communications network having a data receiver as an input module for receiving the serial data stream and a database in which data is replicated based on the first commutation format including a decommutation engine for receiving the serial data stream propagated along the communications channel, decommutating the data, and replicating the data within the database and including a plurality of receivers with individual ones of said receivers subscribing to a selected message type; and a commutation database associated with the commutation and decommutation engine of the first and second communications networks and having commutation format definitions and commutation and decommutation tables operative with the commutation and decommutation engines for changing the commutation format to a second commutation format that prioritizes different data to be commutated and later replicated, wherein said commutation engine in said first communications network is operative for changing the commutation format and modifying and prioritizing a data set and data update frequency scheme to fit within an allotted bandwidth through the router to the at least second communications network and transmitted to selected receivers based on which message type a receiver has subscribed and the decommutation engine at the second communications network decommutates the data and stores the new data with prioritized different data in the database at the second communications network based on the second commutations format.

9. A system according to claim 8, and further comprising a commutation format generator mechanism operative with the commutation database for updating the commutation database with a new commutation format.

10. A system according to claim 8, wherein the commutation format is changed based on a change in environment effecting the data stream.

11. A system according to claim 8, wherein the commutation format is changed based on changing data requirements at a receiver at the second communications network.

12. A system according to claim 8, wherein a change in commutation format is initiated by a receiver at the second communications network.

13. A system according to claim 8, wherein a change in commutation format is initiated by a transceiver at the first communications network.

14. A system according to claim 8, wherein said data transmitter comprises a distributed messaging system that provides communications among modules that generate and format data into a data stream based on a commutation format.

15. A method of propagating data among different communications networks comprising the steps of:
providing a first communications network having an output module and a commutation engine and a plurality of communications transceivers that communicate with each other and communicate through the commutation engine and output module to other communications networks;
sampling data received from the different communications transceivers and commutating data from the different communications transceivers within the first communications network into a serial data stream based on a first commutation format and in priority based on different message types as registered by each communications transceiver and outputting the data stream;
receiving the serial data stream within a router and transferring the data to a second communications network having a plurality of receivers with individual ones of said receivers subscribing to a selected message type and an input module for receiving the serial data stream and decommutation engine and based on the first commutation format, decommutating the data stream within the decommutation engine to replicate the data; and
changing the commutation format to a second commutation format based on a commutation database having commutation format definitions and commutation and decommutation tables and associated with the commutation and decommutation engines of first and second communications networks for prioritizing different data based on the message types from the communications transceivers in the first communications network, wherein said commutation engine in said first communications network is operative for changing received, sampled data into a second commutation format and modifying and prioritizing a data set and data update frequency scheme based on message types as registered by each communications transceiver to fit within an allotted bandwidth through the router to the at least second communications network and transmitting to selected receivers based on which message type a receiver has subscribed and at the second communications network, decommutating the data and storing the new data that is prioritized differently in a database at the second communications network in which the data is replicated based on the second commutation format.

16. A method according to claim 15, and further comprising the step of sampling data and storing the sampled data within a database at the first communications network from which data is commutated.

17. A method according to claim 15, and further comprising the step of storing communication definitions for a commutation format within a commutation database and updating the commutation database with a new commutation format.

18. A method according to claim 15, and further comprising the step of providing multiple commutation formats for multiple receivers at the second communications network.

19. A method according to claim 15, and further comprising the step of changing the commutation format based on a change in environment effecting the data stream.

20. A method according to claim 15, and further comprising the step of changing the commutation format based on changing data requirements at a receiver at the second communications network.

21. A method according to claim 15, and further comprising the step of initiating a change in commutation format from a receiver that receives the serial data stream at the second communications network.

22. A method according to claim 15, and further comprising the step of initiating a change in commutation format from a transceiver that transmits the data stream at the first communications network.

23. A method of propagating data among different communications networks comprising the steps of:
sampling data from different communications transceivers of a first communications network that communicate to each other;
storing the sampled data within a database of the first communications network;
commutating data from the database into a serial data stream based on a first commutation format that prioritizes different data types received from the different communications transceivers based on different message types as registered by each communications transceiver;
propagating the commutated data as prioritized based on the different message types through a router over a communications channel to a receiver as an input module that is part of a second communications network having a plurality of receivers with individual ones of said receivers subscribing to a selected message type;
decommutating the commutated data at the second communications network within a decommutation engine based on the first commutation format to replicate data of the database at the first communications network; and
changing the commutation format to a second commutation format based on a commutation database having commutation format definitions and commutation and decommutation tables and associated with the engines of first and second communications networks for prioritizing different data that is sampled from transceivers at the first communications network commutated and replicated at the receiver, wherein said commutation engine in said first communications network is operative for changing the commutation format and modifying and prioritizing a data set and data update frequency scheme based on message types as registered by each communications transceiver to fit within an allotted bandwidth through the router to the at least second communications network and transmitting to selected receivers based on which message type a receiver has subscribed and at the second communications network, decommutating the data and storing the new data that is prioritized different data in a database at the second communications network that replicates the data based on the second commutation format.

24. A method according to claim 23, and further comprising the step of changing the commutation format based on congestion within the communications channel.

25. A method according to claim 23, and further comprising the step of decommutating data at the receiver at the second communications network based on the commutation format of transmitted data.

26. A method according to claim 23, and further comprising the step of storing commutation definitions for a commutation format within a commutation database and updating the commutation database with a new commutation format.

27. A method according to claim 23, and further comprising the step of providing multiple commutation formats for multiple receivers at the second communications network.

28. A method according to claim 23, and further comprising the step of changing the commutation format based on a change in environment effecting the serial data stream.

29. A method according to claim 23, and further comprising the step of changing the commutation format based on changing data requirements at the receiver at the second communications network.

30. A method according to claim 23, and further comprising the step of initiating a change in commutation format from a receiver at the second communications network that receives the data stream.

31. A method according to claim 23, and further comprising the step of initiating a change in commutation format from a transceiver that transmits the data stream from the first communications network.

* * * * *